(12) United States Patent
Delannoy et al.

(10) Patent No.: US 8,141,824 B2
(45) Date of Patent: Mar. 27, 2012

(54) METHOD AND DEVICE FOR PILOTING AN AIRCRAFT ABOUT A PILOTING AXIS

(75) Inventors: Stéphane Delannoy, Pujaudran (FR); Thierry Bertin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 521 days.

(21) Appl. No.: 12/282,108

(22) PCT Filed: Apr. 5, 2007

(86) PCT No.: PCT/FR2007/000578
§ 371 (c)(1),
(2), (4) Date: Sep. 8, 2008

(87) PCT Pub. No.: WO2007/116134
PCT Pub. Date: Oct. 18, 2007

(65) Prior Publication Data
US 2009/0020651 A1    Jan. 22, 2009

(30) Foreign Application Priority Data

Apr. 11, 2006 (FR) .................................. 06 03183

(51) Int. Cl.
*G05D 1/00* (2006.01)
(52) U.S. Cl. ...................................................... 244/194
(58) Field of Classification Search .................. None
See application file for complete search history.

(56) References Cited

U.S. PATENT DOCUMENTS

| | | | |
|---|---|---|---|
| 3,512,737 A * | 5/1970 | Bedell, Jr. et al. | 244/175 |
| 4,964,599 A * | 10/1990 | Farineau | 244/195 |
| 5,072,893 A | 12/1991 | Chakravarty | |
| 5,224,667 A | 7/1993 | Lacabanne | |
| 6,352,223 B1 * | 3/2002 | Larramendy | 244/177 |
| 6,622,972 B2 * | 9/2003 | Urnes et al. | 244/194 |
| 2003/0189129 A1 | 10/2003 | Kubica | |
| 2003/0205644 A1 | 11/2003 | Najmabadi | |
| 2004/0098176 A1 * | 5/2004 | Raimbault et al. | 701/3 |

FOREIGN PATENT DOCUMENTS

| | | |
|---|---|---|
| EP | 0 293 018 | 11/1988 |
| EP | 0 497 660 | 8/1992 |
| EP | 1 353 253 | 10/2003 |

OTHER PUBLICATIONS

International Search Report dated Aug. 20, 2007 w/ English translation.
Written Opinion of the International Searching Authority with English translation, Oct. 11, 2008.

\* cited by examiner

*Primary Examiner* — Timothy D Collins
*Assistant Examiner* — Jamie S Stehle
(74) *Attorney, Agent, or Firm* — Dickinson Wright, PLLC

(57) ABSTRACT

The flight-control device (1) makes it possible, by offsetting part of a flight command according to a particular flight path, to obtain the same control as is obtained with usual flight control, but without flexible excitation that generates discomfort in the aircraft.

7 Claims, 1 Drawing Sheet

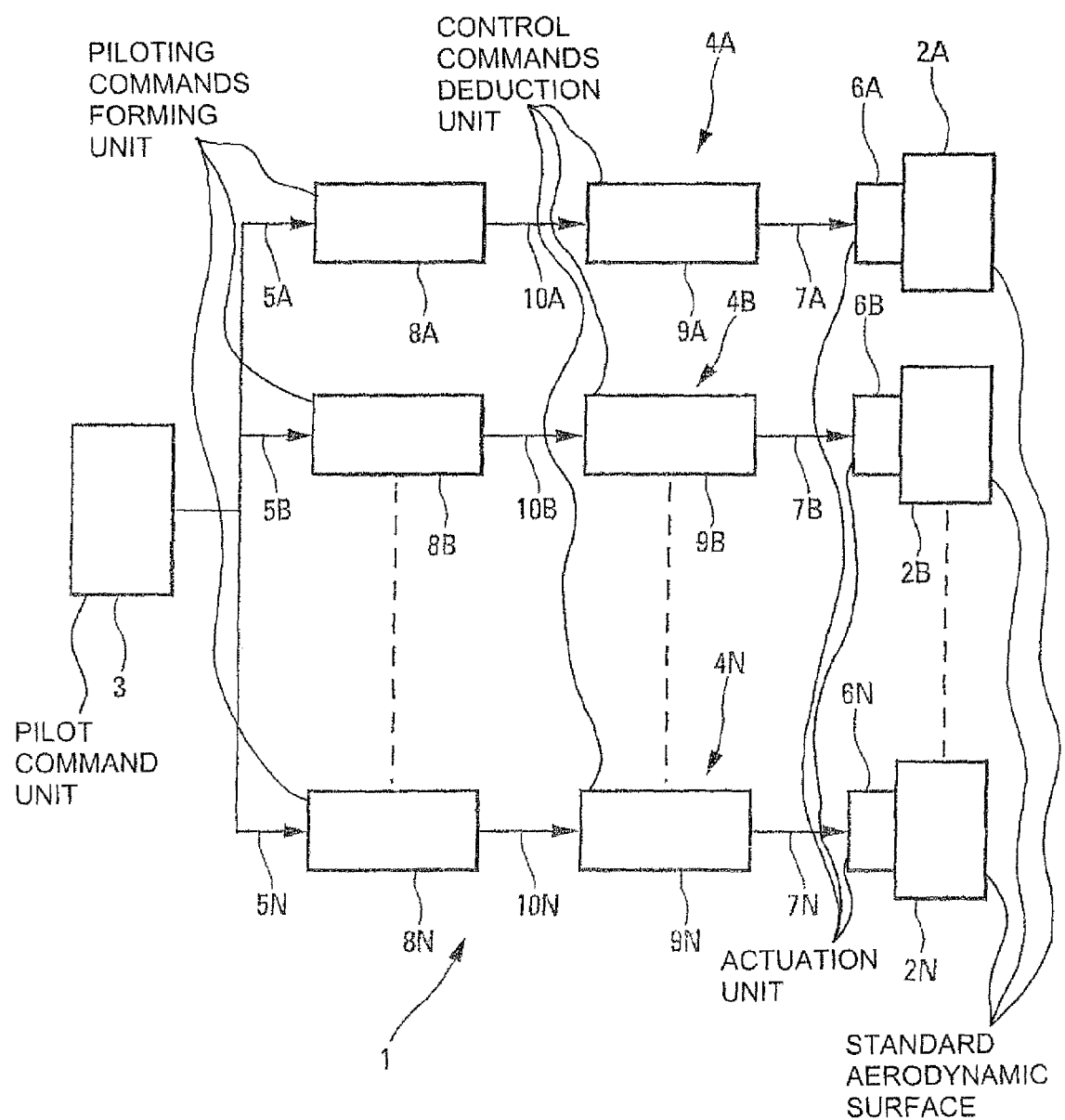

METHOD AND DEVICE FOR PILOTING AN AIRCRAFT ABOUT A PILOTING AXIS

FIELD OF THE INVENTION

The present invention relates to a method and a device for piloting an aircraft, in particular a transport airplane, about a piloting axis.

BACKGROUND OF THE INVENTION

Although not exclusively, the present invention applies more particularly to the piloting of an airplane about its roll axis. It is known that the roll control and piloting of an airplane are performed by moving roll airfoils viz. the ailerons and/or the spoilers. If the wing of the airplane is sufficiently flexible, and if the ailerons and/or the spoilers are moved in a relatively dynamic manner, this roll piloting produces a not inconsiderable structural excitation, which generates uncomfortable accelerations along the cabin of the airplane.

A standard solution for minimizing this structural excitation and thus increasing the comfort of the pilot and passengers consists in filtering the movements of the ailerons and spoilers, so as to attenuate the high-frequency components (greater than 1 Hz) of the piloting command. However, this standard solution produces a significant piloting problem, since the movements of the ailerons and spoilers are then phase-shifted with respect to the commands, and this may produce a loss of precision of the piloting, or indeed an unstable coupling between the pilot and the structure of the airplane.

SUMMARY OF THE INVENTION

The present invention relates to a method for piloting an aircraft about a piloting axis, which makes it possible to remedy the above-mentioned drawbacks.

For this purpose, according to the invention, said method for piloting an aircraft about a piloting axis, said aircraft comprising a plurality of N controllable aerodynamic surfaces capable of producing a movement of the aircraft about said piloting axis, according to which method the following series of successive operations is carried out in an automatic and repetitive manner:
a) an overall piloting command relating to said piloting axis is produced;
b) on the basis of this overall piloting command, individual control commands are determined, intended for said N controllable aerodynamic surfaces; and
c) said individual control commands are applied to said aerodynamic surfaces,
is noteworthy in that:
in step b), on the basis of said overall piloting command, N individual piloting commands relating respectively to said N aerodynamic surfaces are formed by multiplying on each occasion said overall piloting command by at least one gain Ki which is positive or negative, i being an integer varying from 1 to N and N being an integer greater than 1, said gains Ki being such that:

$$\sum_i |Ki| = N;$$

they make it possible to reduce the excitation of N−1 flexible modes of the aircraft, which are responsible for a discomfort of the latter, these N−1 flexible modes being chosen as a function of the current values of parameters related to the aircraft; and applied together said N individual piloting commands producing effects which correspond overall to the effect of said overall piloting command, as regards the piloting of the aircraft about said piloting axis, these N commands being obtained by solving a linear system of N−1 equations with N unknowns;

in step b), said individual control commands are thereafter deduced from said individual piloting commands; and in step c), to said aerodynamic surfaces are applied:
initially, solely the individual control commands which have been deduced from individual piloting commands obtained on the basis of positive gains Ki; and
after a predetermined duration, all said individual control commands deduced in step b).

Thus, by virtue of the inventions the overall piloting command dispatched to the various aerodynamic surfaces with the aim of reducing the excitation of a number N−1 of flexible modes which are responsible for the discomfort of the aircraft is differentiated. This makes it possible to reduce this discomfort, while producing a piloting about said piloting axis which complies with said overall piloting command.

It will be noted that within the framework of the present invention:

the gains and offset values specified below are determined on the basis of standard mathematical models of the aircraft. These gains and offset values depend on the current values of parameters related to the aircraft, and in particular the speed and the mass of the aircraft. The gains and offset values are, preferably, tabulated, as a function of the parameters on which they depend, in two-dimensional arrays. Consequently, as a function of the current values measured of these parameters in the course of flight, the corresponding gains and offset values are chosen automatically with the aid of these arrays. These gains and offset values can be refined by taking account of other parameters that are measurable on the aircraft; and the flexible modes of the aircraft are known, in a standard manner, on the basis of mathematical models of the aircraft. These flexible modes evolve in the flight domain of the aircraft, as a function of the current values of parameters related to said aircraft, such as the speed, mass or Mach number. Consequently, as a function of the current values measured of these parameters in the course of flight, said N−1 flexible modes (the excitation of which is reduced) are chosen automatically, in particular with the aid of a tabulation.

In a particular embodiment, the method in accordance with the present invention is implemented in real time on the basis of the measurement of the speed of the aircraft. Thus, when the current speed of the aircraft reaches a domain where the action produced by the implementation of the invention is desired, said method is implemented. The activation of this implementation can depend on other parameters, in particular those mentioned above which make it possible to determine the gains and offset values.

In an advantageous manner, said predetermined duration is the half-period of a flexible mode which produces the most negative effect on the comfort of the aircraft.

In a first embodiment:
the gains Ki are such that the sum $$\sum_i Ki$$

is equal to zero; and
in step c):
initially, control commands producing the following overall effect Effg are applied:

$$Effg = \sum_j Kj \cdot Eff(t),$$

the various j being the integers i for which the corresponding gains Kj are positive, and Eff(t) being the command that would be dispatched in an equal manner to the N aerodynamic surfaces to obtain the overall effect N.Eff(t); and
after said predetermined duration T, control commands producing the following overall effect Effg are applied:

$$Effg = \sum_j Kj \cdot Eff(t) + \sum_l |Kl| \cdot Eff(t-T)$$

the various $\ell$ being the integers i for which the corresponding gains K$\ell$ are negative.

Furthermore, in a second embodiment making it possible to remove a possible bias in the piloting command for the time span between t=0 and t=T:
the gains Ki are such that the sum $$\sum_i Ki$$

is different from zero; and
instep c):
initially, control commands producing the following overall effect Effg are applied:

$$Effg = KA \cdot \sum_j Kj \cdot Eff(t),$$

the various j being the integers i for which the corresponding gains Kj are positive, Eff(t) being the command that would be dispatched in an equal manner to the N aerodynamic surfaces to obtain the overall effect N.Eff(t), and KA being a gain which satisfies the following relation:

$$KA \cdot \sum_j Kj = N$$

after said predetermined duration T, control commands producing the following overall effect Effg are applied:

$$Effg = \left[KA \cdot \sum_j Kj \cdot Eff(t)\right] - \left[KB \cdot \sum_j Kj \cdot Eff(t-T)\right] + \left[(KA+KB) \cdot \sum_l |Kl| \cdot Eff(t-T)\right]$$

the various $\ell$ being the integers i for which the corresponding gains K$\ell$ are negative, and KB being a gain which satisfies the following relation:

$$\left[(KA-KB) \cdot \sum_j Kj\right] + \left[(KA+KB) \cdot \sum_l |Kl|\right] = N$$

In a preferred application of the invention, said piloting axis is the roll axis of the aircraft which is fitted with two wings, said aerodynamic surfaces are ailerons (and/or spoilers) which are mounted on said wings, and N is the number of ailerons (and of spoilers).

However, the present invention can also be applied to the yaw piloting of an aircraft so that, in this case, said piloting axis is the yaw axis of the aircraft, and said aerodynamic surfaces are rudders of said aircraft.

The present invention also relates to a device for piloting an aircraft about a piloting axis, for example its roll axis or its yaw axis, said aircraft comprising a plurality of N controllable aerodynamic surfaces capable of producing a movement of the aircraft about said piloting axis.

For this purpose, according to the invention, said device of the type comprising:
first means for producing an overall piloting command relating to said piloting axis;
second means for determining, on the basis of this overall piloting command, individual control commands intended for said N controllable aerodynamic surfaces; and
third means for applying said individual control commands to said aerodynamic surfaces,
is noteworthy in that:
said second means comprise means for forming, on the basis of said overall piloting command, N individual piloting commands relating respectively to said N aerodynamic surfaces, by multiplying on each occasion said overall piloting command by at least one gain Ki which is positive or negative, i being an integer varying from 1 to N and N being an integer greater than 1, said gains Ki being such that:

$$\sum_i |Ki| = N;$$

they make it possible to reduce the excitation of N−1 flexible modes of the aircraft, which are responsible for a discomfort of the latter, the N−1 flexible modes being chosen as a function of the current values of parameters related to the aircraft; and
applied together said N individual piloting commands producing effects, which correspond overall to the effect of said overall piloting command as regards the piloting of the aircraft about said piloting axis,
these N commands being obtained by solving a linear system of N−1 equations with N unknowns;

said second means comprise, moreover, means for deducing said individual control commands from said individual piloting commands; and said third means are formed so as to apply to said aerodynamic surfaces:

initially, solely the individual control commands which have been deduced from individual piloting commands obtained on the basis of positive gains Ki; and after a predetermined duration, all said individual control commands.

BRIEF DESCRIPTION OF THE DRAWINGS

The single FIGURE of the appended drawing will elucidate the manner in which the invention may be embodied. This single FIGURE is the schematic diagram of a piloting device in accordance with the invention.

DETAILED DESCRIPTION OF THE INVENTION

The device 1 in accordance with the invention and represented schematically in the FIGURE is intended for piloting an aircraft, in particular a transport airplane, about a piloting axis, for example the roll axis or the yaw axis. Within the framework of the present invention, said aircraft (not represented) comprises a plurality of N standard aerodynamic surfaces 2A, 2B, ..., 2N, which are controllable and which are capable of producing a movement of the aircraft about said piloting axis, N being an integer greater than 1.

In a preferred application of the invention, said piloting axis is the roll axis of the aircraft which corresponds to an airplane (and which is therefore fitted with two wings), said aerodynamic surfaces 2A to 2N are ailerons and/or spoilers which are mounted on said wings, and N is the number of ailerons and of spoilers.

However, the present invention can also be applied to the yaw piloting of an aircraft so that, in this case, said piloting axis is the yaw axis of the aircraft, and said aerodynamic surfaces 2A to 2N are rudders of said aircraft.

Said device 1 is of the type comprising:

standard means 3 making it possible to produce an overall piloting command which relates to the piloting axis considered. In a standard manner, said means 3 comprise in particular a control means, such as a ministick or a rudderbar for example, which is capable of being actuated by a pilot of the aircraft. These means 3 also comprise a set of standard information sources capable of measuring the current values of parameters related to the aircraft, such as its speed or its Mach number, and of determining the values of other parameters of the aircraft such as its mass;

a plurality of means 4A, 4B, ..., 4N which are connected by way of links 5A, 5B, ..., 5N to said means 3 and which are intended to determine, on the basis of the overall piloting command received from said means 3, individual control commands intended respectively for said N controllable aerodynamic surfaces 2A, 2B, ..., 2N; and means 6A, 6B, ..., 6N, for example standard actuation means, which are connected by way of links 7A, 7B, ..., 7N to said means 4A, 4B, ..., 4N and which are intended to apply the individual control commands received from said means 4A, 4B, ..., 4N to said aerodynamic surfaces 2A, 2B, ..., 2N.

Moreover, according to the invention:

said means 4A to 4N comprise means 8A, 8B, ..., 8N which are intended to form, on the basis of said overall piloting command received from said means 3, N individual piloting commands relating respectively to said N aerodynamic surfaces 2A to 2N. Said means 8A to 8N calculate these individual piloting commands, by multiplying on each occasion said overall piloting command by at least one gain Ki which is positive or negative, i being an integer varying from 1 to N and N being an integer greater than 1. According to the invention, said gains Ki are such that the following conditions a) to c) are satisfied simultaneously:

$$a) \sum_i |Ki| = N;$$

b) they make it possible to reduce the excitation of N−1 flexible modes of the aircraft, which are responsible for a discomfort of the latter, these N−1 flexible modes being chosen as a function of the current values of parameters related to the aircraft; and c) applied together said N individual piloting commands producing effects, which correspond overall to the effect of said overall piloting command as regards the piloting of the aircraft about said piloting axis (roll or yaw);

said means 4A to 4N comprise, moreover, means 9A to 9N which are connected by way of links 10A to 10N to said means 8A to 8N and which are intended to deduce, in a standard manner, said individual control commands from said individual piloting commands. Accordingly, they carry out a standard conversion; and said means 6A to 6N are formed so as to apply to said aerodynamic surfaces 2A to 2N:

initially (at a time t=0), solely the individual control commands which have been deduced from individual piloting commands obtained on the basis of positive gains Ki; and after a predetermined duration T specified below (that is to say at a time t=T), all said individual control commands (produced by said means 9A to 9N).

It is known that a so-called flexible aircraft possesses numerous flexible modes (frequency between 1 and 15 Hz approximately), many of which from among the lowest in frequency (and therefore those which are felt the most by people aboard the aircraft) exhibit a significant strain of the structure of the aircraft, and in particular of its wing, where nodes (stationary point with respect to this mode) and antinodes (exhibiting the highest strain between two nodes) appear. A flexible mode is therefore characterized by its frequency, its damping rate and its geometric distribution with antinodes and nodes. As the various aerodynamic surfaces 2A to 2N are not all situated at the same location of the structure, they are further away from or closer to these antinodes and these nodes. These geometric characteristics give rise to a basic principle used in the present invention, namely that with an identical deflection, the various aerodynamic surfaces 2A to 2N do not excite, either with the same gains, or with the same phases, the various flexible modes which exhibit an impact on the comfort of the aircraft in the cabin. So, with N aerodynamic surfaces 2A to 2N, there exists a set of gains Ki (i going from 1 to N) such that by requiring an effectiveness Effi from each aerodynamic surface 2A to 2N, the excitation of N−1 flexible modes which are responsible for the discomfort in the cabin is very substantially reduced while satisfying the following equation:

$$\sum_i |Ki| = N,$$

which is obtained in a standard manner by solving a linear system of N−1 equations with N unknowns.

It will be noted that, in a standard manner, distributing a command DP over N aerodynamic surfaces so that they do not excite one particular flexible mode, amounts to solving a linear system of 1 equation with N unknowns. Within the framework of the present invention, as there are N aerodynamic surfaces 2A to 2N, distributing the command DP so as not to excite N−1 flexible modes, therefore amounts to solving a linear system of N−1 equations with N unknowns.

The linear system of command N−1 to be solved can thus be formulated:

N: number of aerodynamic surfaces used;
M1, M2, . . . , MN−1: the N−1 flexible modes that are considered; and
2A, 2B, . . . , 2N: the N aerodynamic surfaces used.

One seeks to reduce the acceleration due to a particular flexible mode Mj, felt at a particular point Pj of the aircraft (flight deck, particular passenger seat, etc.), when an overall roll command denoted Eff is ordered. The command Eff is normalized to 1, and the maximum amplitude of the acceleration due to Mj at Pj is observed (frequency analysis of the acceleration at Pj), felt when this command is applied solely to the airfoil 2i. This amplitude will be denoted Aij.

It may therefore be noted that, for any i from [1, N], for any j from [1, N−1], Aij is the amplitude of the acceleration at the point Pj of the aircraft, due to the flexible mode Mj alone, when a normalized deflection command is dispatched to the airfoil 2i alone. If the same point Pj is chosen for all the modes Mj, one seeks to minimize the acceleration at a point of the aircraft. If different points Pj are chosen, this makes it possible to minimize local effects of the flexible modes, depending on whether for example they make the rear or the front of the aircraft vibrate more.

The linear system to be solved consists in calculating the N gains Ki to be applied to the N airfoils 2i, such that, for an overall command Eff, the command calculated for the airfoil 2i is Effi=Ki.Eff, and the component of acceleration of the flexible mode Mj at the point Pj is zero. This system of N−1 equations with the N unknowns Ki may be written:

$$\begin{cases} \sum_1^N Ki \cdot Ai1 = 0 \\ \sum_1^N Ki \cdot Ai2 = 0 \\ \ldots \\ \sum_1^N Ki \cdot AiN - 1 = 0 \end{cases}$$

or also:

$$\text{for any } j \in [1, N-1], \sum_1^N Ki \cdot Aij = 0$$

The solution of such a system may be written as a collection of gains Ki, all proportional to the gain K1, the value of the gain K1 being free.

It then merely remains to consider the equation $$\sum_1^N |Ki| = N,$$

so as to fix the value of K1 and therefore of all the gains Ki.

The gains Ki and associated offset values specified below are therefore determined, in a standard manner, on the basis of standard mathematical models of the aircraft. These gains and offset values depend, in a standard manner, on the current values of parameters related to the aircraft, and in particular the speed and mass. These gains and offset values are, preferably, tabulated, as a function of the parameters on which they depend, in two-dimensional arrays. Consequently, as a function of the current values of these parameters, which are measured in the course of flight by the above-mentioned information sources, means (forming for example part of said means 4A to 4N) of the device 1 automatically select the corresponding gains and offset values with the aid of these arrays which are preferably stored. These gains and offset values can be refined by taking account of other parameters that are measurable on the aircraft.

Furthermore, the flexible modes of the aircraft are known, in a standard manner, on the basis of standard mathematical models of the aircraft. These flexible modes evolve in the flight domain of the aircraft, as a function of the current values of parameters related to said aircraft, such as the speed, mass or Mach number. Consequently, as a function of the current values of these parameters which are measured in the course of flight by the above-mentioned information sources, means (forming for example part of said means 4A to 4N) of the device 1 automatically select the N−1 flexible modes, the excitation of which is to be reduced by the device 1.

Additionally, in a particular embodiment, the device 1 in accordance with the invention is activated on the basis of the measurement (carried out by one of said above-mentioned information sources) of the speed of the aircraft. Thus, when the current speed of the aircraft reaches a domain where the action produced by the device 1 is desired, said device 1 is activated. This activation can depend on other parameters, in particular those mentioned above which make it possible to determine the gains and offset values.

It is considered that the aerodynamic surfaces 2A to 2N are all, either in phase, or in phase opposition, as regards the excitation of the various modes concerned. Consequently, the above-mentioned offset values exhibit one of the following two values: 0 and π. Consequently, the various gains Ki are either positive, or negative. So, for a given frequency, a signal at t=0 is in phase opposition with the same signal at t=1, where t1 corresponds to the half-period of the signal. It may therefore be considered that, for each of the frequencies of which they are composed, the signals which possess a negative gain Ki are equal to the same signals multiplied by −1 (therefore possessing a gain |Ki|), and are offset over time by a half-period of the frequency considered.

If an effectiveness request Eff(t) dispatched, in a standard manner, to each of the N aerodynamic surfaces 2A to 2N is considered at t=0 [an overall request Effg=N.Eff(t) is therefore made], this request will excite the flexible modes that generate discomfort. If, instead of this standard request (carried out hitherto), the following request is made in accordance with the present invention:

at t=0, an effectiveness Ki.Eff(t) is requested from each of the aerodynamic surfaces, whose gain Ki is positive;

then, from t=T onwards, the effectiveness $|Ki|.Eff(t-T)$ is requested in addition from each of the aerodynamic surfaces whose gain Ki is negative, a request equivalent to Effg is obtained from t=T onwards, but the excitation of N−1 flexible modes has been greatly reduced, or indeed cancelled.

Of course, for this purpose the N−1 modes which mainly impact the comfort of the aircraft are chosen.

The piloting device 1 in accordance with the invention implements the principle presented above. Accordingly, it therefore differentiates the overall piloting command dispatched to the various aerodynamic surfaces 2A to 2N with the aim of reducing the excitation of a number N−1 of flexible modes which are responsible for the discomfort of the aircraft. This makes it possible to reduce or indeed to cancel this discomfort, while producing a piloting about said piloting axis (roll or yaw) which complies with said overall piloting command.

It will be noted that said predetermined duration T is, preferably (for reasons of maximum effectiveness), the half-period of the flexible mode (among said N−1 flexible modes) which most impacts the comfort of the aircraft.

The embodiment such as mentioned above of the piloting device 1 in accordance with the invention therefore makes it possible, with the aid of an offset of duration T of a part of the piloting command, to obtain the same control (for t greater than T) as in the case of standard piloting, but without a flexible excitation that generates discomfort.

In a first simplified embodiment, for which the gains Ki are such that the sum $$\sum_i Ki$$

is equal to zero, the piloting device 1 is formed so as to carry out the following operations:

initially (at t=0), apply control commands producing the following overall effect Effg:

$$Effg = \sum_j Kj \cdot Eff(t),$$

the various j being the integers i for which the corresponding gains Kj are positive, and Eff(t) being the command that would be dispatched in an equal manner to the N aerodynamic surfaces 2A to 2N to obtain the overall effect N.Eff(t); and after said predetermined duration T (at t=T), apply control commands producing the following overall effect Effg:

$$Effg = \sum_j Kj \cdot Eff(t) + \sum_l |Kl| \cdot Eff(t-T)$$

the various $l$ being the integers i for which the corresponding gains $Kl$ are negative.

As indicated previously, in a standard realization, an individual control command DP is distributed in an identical manner over the N aerodynamic surfaces considered. In this case, the overall effectiveness is equal to N.DP. On the other hand, in the present invention, this command is distributed differently over the N aerodynamic surfaces 2A to 2N. Each individual command DPi exhibits an individual gain ki and a phase φi dependent on frequency and thus satisfies the following expression:

$$DPi = ki \cdot e^{j\Phi i} \cdot DP$$

According to the invention, an approximation is made by considering that the aerodynamic surfaces 2A to 2N are either in phase, or in phase opposition. Thus, the phases can be reduced to two values 0 and π, and $e^{j\Phi i}$ takes either the value 1 ($=e^0$), or the value −1 ($=e^{j\pi}$). Consequently, the above-mentioned gains Ki taken into account in the present invention take one of the following values: +ki, −ki. This is why the gains Ki used in the present invention are not standard gains representing positive integers, but can be positive or negative.

For each of the frequencies of which they are composed, the signals which possess a negative gain Ki are equal to the same signals multiplied by −1 (therefore possessing a gain |Ki|) and are offset over time by a half-period T of the frequency considered (representing an offset of π).

Moreover, as indicated previously, these gains Ki (positive or negative) must satisfy the equation:

$$\sum_i |Ki| = N$$

so as to preserve the above-mentioned overall effectiveness Effg=N.DP [of course DP=Eff(t)]. Specifically, this overall effectiveness Effg may be written, after said predetermined duration T:

$$Effg = \sum_j Kj \cdot Eff(t) + \sum_l |Kl| \cdot Eff(t-T)$$

The various j are the integers i for which the corresponding gains Kj are positive, and the various $l$ are the integers i for which the corresponding gains $Kl$ are negative.

We therefore obtain:

$$Effg = \left(\sum_j Kj + \sum_l |Kl|\right) \cdot DP = \sum_i |Ki| \cdot DP = N \cdot DP$$

The overall effectiveness Effg therefore does indeed satisfy the value N.DP.

It will be noted that with said first above-mentioned simplified embodiment, a bias in the piloting command may however persist during the time span between t=0 and t=T, during which the piloting command is not completely carried out with the above-mentioned solution.

To remedy this drawback, in a second embodiment, for which the gains Ki are such that the sum $$\sum_i Ki$$

is different from zero, the piloting device 1 is formed so as to carry out the following operations:

initially (at t=0), apply control commands producing the following overall effect Effg:

$$Effg = KA \cdot \sum_j Kj \cdot Eff(t),$$

KA being a gain which satisfies the following relation:

$$KA \cdot \sum_j Kj = N$$

after said predetermined duration T (at t=T), apply control commands producing the following overall effect Effg:

$$Effg = \left[KA \cdot \sum_j Kj \cdot Eff(t)\right] - \left[KB \cdot \sum_j Kj \cdot Eff(t-T)\right] + \left[(KA+KB) \cdot \sum_l |Kl| \cdot Eff(t-T)\right]$$

the various $\ell$ being the integers i for which the corresponding gains $K\ell$ are negative, and KB being a gain which satisfies the following relation:

$$\left[(KA - KB) \cdot \sum_j Kj\right] + \left[(KA+KB) \cdot \sum_l |Kl|\right] = N$$

It will be noted that the piloting device 1 in accordance with the invention makes it possible mathematically to cancel the excitation of N−1 flexible modes, but, practically, it is very effective on at least N structural modes, since several of them exhibit very similar strains. A collection of gains that is suited to a particular mode is naturally suited to the other close strain modes.

The invention claimed is:

1. A method for piloting an aircraft about a piloting axis, said aircraft comprising a plurality of N controllable aerodynamic surfaces that produce a movement of the aircraft about said piloting axis, the method comprising the steps of:
   a) producing an overall piloting command relating to said piloting axis;
   b) determining individual control commands based on the overall piloting command;
   c) converting each individual control command to an individual piloting command; and
   d) actuating, according to the individual piloting command, at least one of said N controllable aerodynamic surfaces to pilot the aircraft about said piloting axis,
   wherein
   each individual control command is determined by multiplying said overall piloting command by at least one gain Ki which is positive or negative, with i being an integer of from 1 to N, N being an integer greater than 1, with the sum of all gains represented by:

$$\sum_i |Ki| = N;$$

wherein the sum of all gains reduces excitation of N-1 flexible modes of the aircraft, with the N-1 flexible modes representing a current value function of parameters related to the aircraft, and with said N individual piloting commands being obtained by solving a linear system of N-1 equations with N unknowns,
   and wherein the individual piloting commands are converted to the individual control commands on the basis of positive gains Ki.

2. The method as claimed in claim 1, wherein:
   the gains Ki are such that the sum $$\sum_i Ki$$

is equal to zero; and
   the individual control commands produce the following overall effect Effg:

$$Effg = \sum_j Kj \cdot Eff(t),$$

j being the integers i for which the corresponding gains Kj are positive, and Eff(t) being the command that would be dispatched in an equal manner to the N aerodynamic surfaces (2A to 2N) to obtain the overall effect N.Eff(t); and
   after a predetermined duration T, the individual control commands produce the following overall effect Effg:

$$Effg = \sum_j Kj \cdot Eff(t) + \sum_l |Kl| \cdot Eff(t-T)$$

l being the integers i for which the corresponding gains Kl are negative.

3. The method as claimed in claim 1, wherein:
   the gains Ki are such that the sum $$\sum_i Ki$$

is different from zero; and
   the individual control commands produce the following overall effect Effg:

$$Effg = KA \cdot \sum_j Kj \cdot Eff(t),$$

j being the integers i for which the corresponding gains Kj are positive, Eff(t) being the command that would be dispatched in an equal manner to the N aerodynamic surfaces (2A to 2N) to obtain the overall effect N.Eff(t), and KA being a gain which satisfies the following relation:

$$KA \cdot \sum_j Kj = N$$

after a predetermined duration T, the individual control commands produce the following overall effect Effg:

$$Effg = \left[KA \cdot \sum_j Kj \cdot Eff(t)\right] -$$
$$\left[KB \cdot \sum_j Kj \cdot Eff(t-T)\right] + \left[(KA + KB) \cdot \sum_l |Kl| \cdot Eff(t-T)\right]$$

l being the integers i for which the corresponding gains Kl are negative, and KB being a gain which satisfies the following relation:

$$\left[(KA - KB) \cdot \sum_j Kj\right] + \left[(KA + KB) \cdot \sum_l |Kl|\right] = N$$

4. The method as claimed in claim 1, wherein said piloting axis is the roll axis of the aircraft which is fitted with two wings, said aerodynamic surfaces are ailerons which are mounted on said wings, and N is the number of ailerons.

5. The method as claimed in claim 1, wherein said piloting axis is the yaw axis of the aircraft, and said aerodynamic surfaces are rudders of said aircraft.

6. A device for piloting an aircraft about a piloting axis, said aircraft comprising a plurality of N controllable aerodynamic surfaces that produce movement of the aircraft about said piloting axis, said device comprising:

pilot command unit that produces an overall piloting command relating to said piloting axis;

individual control units that determine, on the basis of the overall piloting command, individual control commands corresponding to each of said N controllable aerodynamic surfaces actuators that apply said individual control commands to actuate said aerodynamic surfaces, wherein:

said individual control units comprise individual pilot command units that produce, on the basis of said overall piloting command, N individual piloting commands relating respectively to said N aerodynamic surfaces, by multiplying said overall piloting command by at least one gain Ki which is positive or negative, i being an integer of from 1 to N, and N being an integer greater than 1, with the sum of all gains represented by:

$$\sum_i |Ki| = N;$$

and wherein the sum of all gains reduces excitation of N-1 flexible modes of the aircraft, with the N-1 flexible modes representing a current value function of parameters related to the aircraft, and with said N individual piloting commands being obtained by solving a linear system of N-1 equations with N unknowns; and said individual control units comprise conversion units that convert said individual piloting commands to said individual control commands, wherein said actuators actuate corresponding aerodynamic surfaces, and wherein the individual piloting commands are converted to the individual control commands on the basis of positive gains Ki.

7. An aircraft, comprising the device of claim 6.

* * * * *